United States Patent Office 3,497,770
Patented Feb. 24, 1970

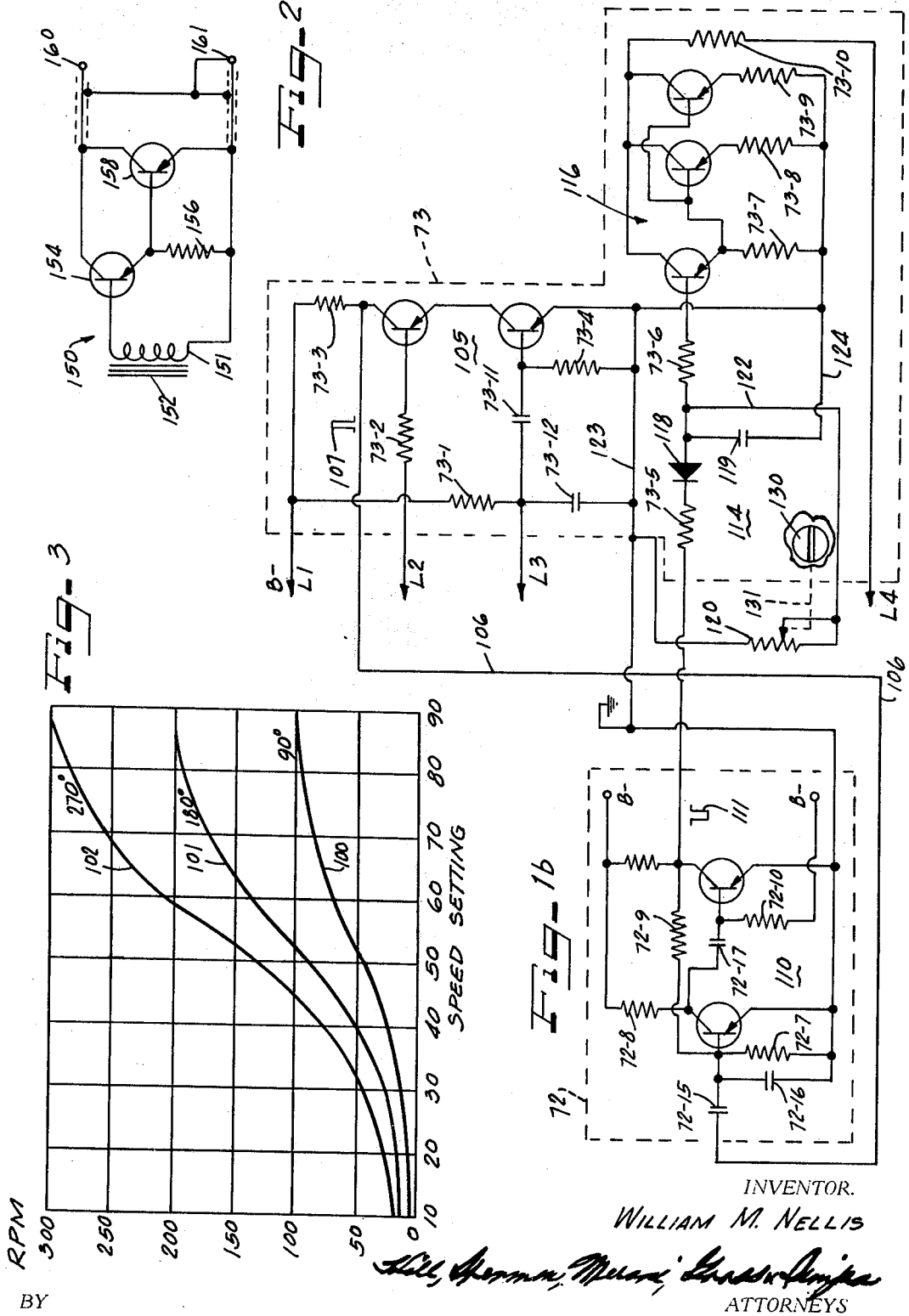

3,497,770
SPEED DETECTOR SYSTEM
William Merton Nellis, St. Paul, Minn., assignor to Mag-Con Engineering Co., St. Paul, Minn., a corporation of Minnesota
Filed Jan. 5, 1967, Ser. No. 607,486
Int. Cl. H05f 3/00
U.S. Cl. 317—5                                    12 Claims

ABSTRACT OF THE DISCLOSURE

Speed is measured in the illustrated embodiment by observing the transit time of a permanent magnet cyclically moving past two successive pick-up coils. Transistor amplifiers enclosed with the coils transmit high amplitude pulses to a remote digital circuit including an AND gate. The presence or absence of output pulses from the AND gate represents respective speed conditions, and a relay driver circuit responds to an output pulse rate of 30 per minute or higher to maintain a control relay in energized condition.

BACKGROUND OF THE INVENTION

One important field of use for the speed detector of the present invention is in sensing conveyor speed. By associating the speed detector system with the driven or tail pulley of a conveyor, slippage of the conveyor relative to the drive pulley can be detected as an underspeed condition. Such slippage can damage the conveyor and even result in a fire hazard under some circumstances. Further, since the conveyor may be utilized to transport raw materials of various types, the speed detector system may be subjected to an extremely adverse environment.

Heretofore, centrifugal type speed sensors have been commonly used, and there has been a serious maintenance problem because of the tendency of dust and dirt to foul the centrifugal switch contacts and render the speed sensor unreliable. An important requirement for a conveyor speed sensor is that it be applicable to a substantial range of pulley diameters and to a substantial range of pulley angular velocities. Another important requirement is that the sensing system operate reliably and accurately over a wide temperature range.

SUMMARY OF THE INVENTION

It is therefore an object of the present invention to provide a speed sensing system where rugged and reliable components are capable of sensing a wide range of speed conditions.

It is another object of the present invention to provide a speed sensing system which is substantially impervious to water, oil, dirt and other contaminants and which is capable of reliable operation over a wide temperature range.

A further object of the invention is to provide a speed sensing system wherein digital circuitry is capable of providing a yes-no type speed indication and can be located at a substantial distance from the parts whose speed is to be sensed.

In accordance with a preferred embodiment of the invention a marker element such as a permanent magnet is mounted on a moving part such as the driven pulley of a conveyor, and one or more sensing heads are disposed along the path of the marker element so as to generate electric pulses whose time spacing is a function of speed. A solid state amplifier device is enclosed with the sensing head so that relatively high amplitude pulses (10 to 20 volts) can be transmitted for substantial distances for example up to several hundred feet. A commercial system recently placed on the market is adjustable to accommodate pulley diameters from 24 to 36 inches and angular velocities from 25 to 300 revolutions per minute. With the sensing head spaced from the marker element a distance of 1 inch, marker velocities as low as 500 inches per minute could be accommodated. This commercial system was rated for operation over a temperature range between 0° and 150° F. Typically. speed changes of as little as 5% could be reliably detected.

A feature of the invention resides in the provision of a sensing head comprising a pick-up coil and a germanium transistor directly connected thereto so as to avoid the need for forward bias of the transistor.

A further feature of the invention resides in the provision of a high sensitivity head utilizing two germanium transistors and one resistor in circuit with the pick-up coil within the head.

Another feature of the invention resides in the provision of a logarithmic time constant adjustment in the digital circuitry so as to provide a more linear adjustment for different speed conditions.

Still another feature of the invention resides in the provision of a relay driving circuit which is capable of mantaining continuous relay energization in response to pulse rates as low as 25 per minute, for example.

Other important objects, features and advantages of the present invention will be apparent from the following detailed description taken in connection with the accompanying drawings.

BRIEF DESCRIPTION OF THE DRAWINGS

FIGS. 1a and 1b (referred to generically as FIG. 1) illustrate a preferred speed sensing system in accordance with the present invention; FIG. 1a including a somewhat diagrammatic showing of a marker for attachment to the driven pulley of a conveyor and of a pair of sensing heads for sensing movement of the marker; and FIGS. 1a and 1b together showing a schematic electric circuit diagram arranged for receiving the outputs from the sensing heads and for controlling a relay in accordance with the speed condition sensed thereby;

FIG. 2 is a diagrammatic illustration of a modified sensing head possessing greater sensitivity than the head design of FIG. 1 so as to be operable at lower speeds of the marker, the other components of the system of FIG. 2 being identical to those of FIG. 1; and FIG. 3 shows a series of curves representing the critical angular velocity values as a function of speed dial setting for sensing head spacings of 90°, 180°, and 270°, respectively.

DESCRIPTION OF THES PREFERRED EMBODIMENTS

Figure 1A:
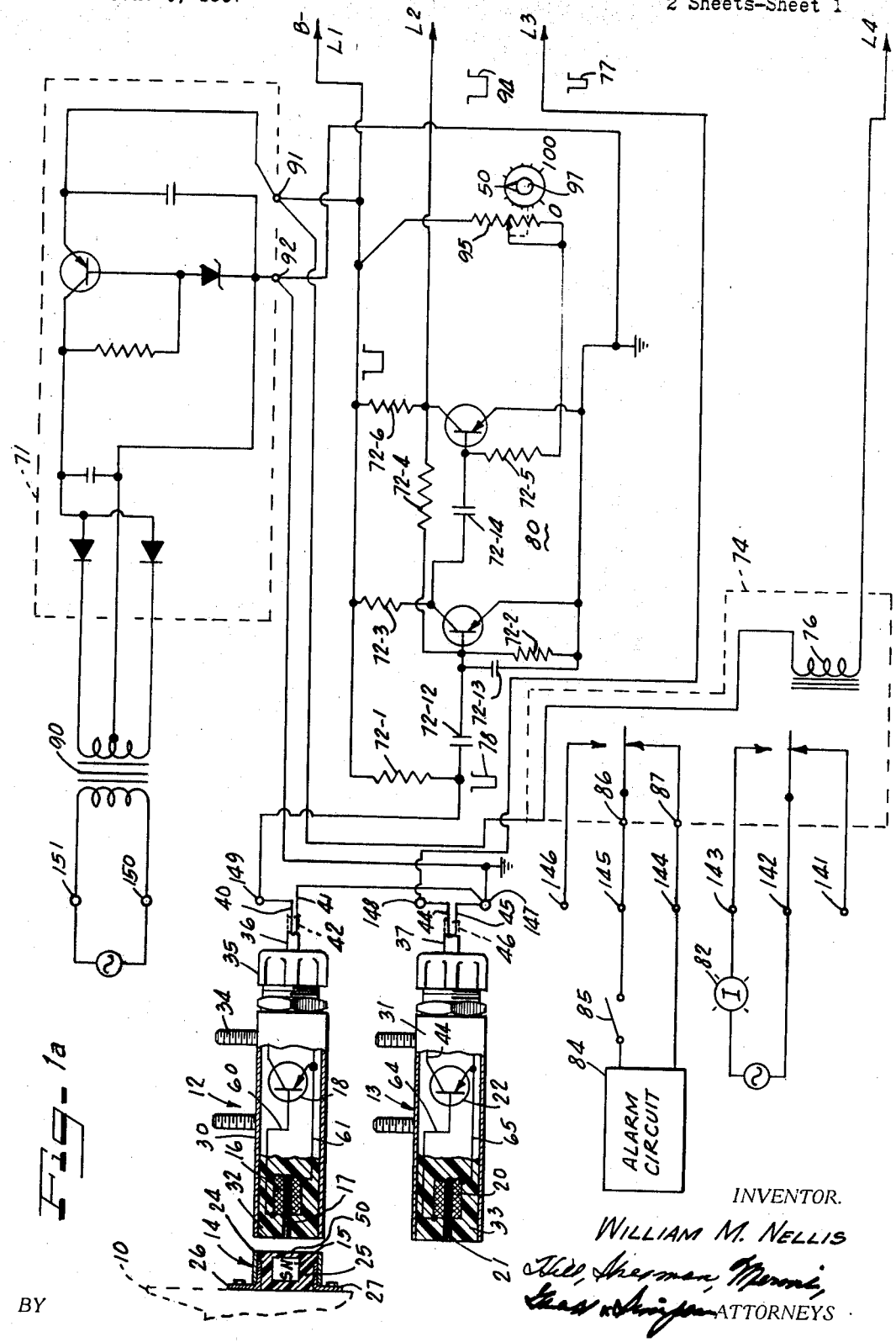

Referring to FIG. 1, so as to illustrate a typical use of the speed sensing system of the present invention, a driven or tail pulley is indicated at 10 in dotted outline, and it is assumed that the system is to be utilized to sense slippage of the conveyor belt relative to a drive pulley (not shown). In the illustrated embodiment, therefore, the sensing is designed to provide a positive indication of an underspeed condition. It will be apparent, however, that the same apparatus may be utilized to signal an overspeed condition, to control speed, or for other purposes.

In the illustrated embodiment, two sensing heads are utilized, a reference sensing head 12 and a delay sensing head 13, and the heads are so arranged as to sense the transit time of a marker 14 which is mounted on the driven pulley 10 so as to travel successively past the heads 12 and 13 in each revolution of the driven pulley.

While the marker 14 could take various forms other than a permanent magnet so that detection could be based on variable reluctance of a magnetic circuit, metal detection, color or photo-detection and the like, in the illustrated commercial embodiment, the marker 14 comprises a permanent magnet 15 which is magnetizedd axially relative to the pulley 10, the north pole of the magnet 15 being indicated by the letter "N" and the south pole of the magnet being indicated by the letter "S." Using this type of marker, the head 12 preferably comprises a coil 16 having a magnetic core part 17 and a germanium transistor 18, the delay head 13 comprising a pick-up coil 20, a magnetic core 21 and a germanium transistor 22. The marker 14 may be jacketed by means of an aluminum tube 24 and epoxy filled as indicated at 25 for water tight and oil tight operation. The marker may be provided with L transformer brackets 26 and 27 for securing the same to the pulley 10. Similarly, the heads 12 and 13 may be provided with aluminum jackets 30 and 31 and may be epoxy filled as indicated at 32 and 33 for water tight and oil tight operation. Mounting studs are provided such as indicated at 34 and liquid tight conduit fittings are provided such as indicated at 35 for receiving respective two conductor shielded cables 36 and 37. The shielding for conductors 40 and 41 leading from sensing head 12 is indicated by dash lines at 42 while the shielding for conductors 44 and 45 from sensing head 13 is indicated by dash lines at 46. The shielding 42 and 46 is grounded and is electrically connected with the jackets 30 and 31.

Preferably the epoxy filling 25 of the marker 14 includes a layer 50 integral therewith which overlies the pole face of the permanent magnet 15 so as to facilitate release of stray magnetic material which may, for example, fall from the conveyor associated with pulley 10.

Referring now to the electric circuit arrangement per se, it will be observed that a conductor 60 extends from one end of coil 16 to the base electrode of transistor 18 and that a conductor 61 extends from the opposite terminal of coil 16 to the emitter electrod of transistor 18 and to conductor 41 within the cable 37. The conductor 40 connects with the collector electrode of transistor 18. Similarly referring to delay sensing head 13, a conductor 64 extends from one terminal of coil 20 to the base electrode of transistor 22, and a second conductor 65 extends from the opposite terminal of coil 20 to the emitter electrode of transistor 22 and also connects with conductor 45. As indicated, conductors 41 and 45 are connected to the chassis which carries the digital circuitry of FIG. 1. The collector electrode of transistor 22 is connected with conductor 44. In the commercial system, cable 36 containing conductors 40 and 41, and cable 37 containing conductors 44 and 45 each have a length of 10 feet. Where longer runs are desired, a junction box is provided to which additional cables can be connected up to 200 feet in length. The transistor amplifiers provided by the PNP germanium transistors 18 and 22 provide high level pulses having an amplitude of from 10 to 20 volts, enabling transmission of the pulses several hundred feet to a control box containing an electric circuit module 71, FIG. 1a; a module 72 comprising circuitry 80, FIG. 1a, and circuitry 110, FIG. 1b; module 73, FIG. 1b; and a module 74, FIG. 1a.

,For the illustrated arrangement, the electric circuitry is to energize relay coil 76 of module 74 when a speed responsive pulse such as indicated at 77 from delay head 13 follows a preceding reference pulse 78 from head 12 by a time interval within a predetermined range as determined by the time constant of a monostable circuit 80 of module 72. When the pulley 10 falls below a critical speed, the speed responsive pulse 77 will lag the corresponding reference pulse 78 by a time interval greater than the predetermined range, and relay 76 will be deenergized. Thus, in the illustrated system, so long as the pulley 10 exceeds the predetermined minimum speed, relay 76 will remain energized, and indicator lamp 82 will be lit. Simply by way of illustration an alarm circuit is indicated at 84 which is connected to normally closed contacts of relay module 74 through a lock-out switch 85 and relay terminals 86 and 87. Thus, when the pulley 10 has reached normal speed, switch 85 may be manually closed, for example, and the circuit between relay terminals 86 and 87 will remain open so long as the pulley 10 is operating above a minimum speed. Thereafter, if the conveyor belt should slip relative to its drive pulley, the drive pulley 10 would fall below the critical speed, relay 76 would be deenergized, and the alarm circuit 84 would be energized. In this way, belt slippage is detected promtply, and can be corrected to avoid possible damage to the belt and even a possible fire hazard under some circumstances.

The power supply modure 71 receives alternating current power from the secondary of a transformer 90 and supplies a regulated direct current potential at terminal 91 which in the illustrated embodiment is minus 18 volts relative to power supply terminal 92 which is shown grounded.

The monostable circuit 80 of module 72 receives the successive reference pulses such as 78 and generates control pulses such as indicated at 94 having a predetermined time duration which in the illustrated embodiment is adjustable by means of a logarithmic potentiometer 95. For the purpose of diagrammatic illustration, a rotary knob is indicated at 97 for adjusting the setting of the potentiometer 95. The knob 97 has a pointer cooperating with a scale having linear indicia marked thereon. In the commercial system the indicia represent knob positions between 0 and 100. Thus if a setting of 0 for the knob 97 corresponds to a resistance value of 250,000 ohms and a setting of 100 of the knob 97 corresponds to a potentiometer value of 0 ohms, a setting of 50 of knob 97 would not represent 125,000 ohms, but would represent a potentiometer value of approximately 80,000 ohms. A setting of knob 97 of approximately 30 could correspond to a potentiometer value of 125,000 ohms. It will be observed from FIG. 3 that the system illustrated becomes relatively insensitive for potentiometer values greater than about 125,000 ohms corresponding to a speed dial setting of 30, so that the benefit of a logarithmic potentiometer 95 can be appreciated. Thus, with a logarithmic potentiometer 95, the system is sensitive over a wider range of settings of the speed selector knob 97. The curves of FIG. 3 may be obtained by setting the heads 12 and 13 90° apart for curve 100, 180° apart for curve 101 and 270° apart (with respect to the direction of movement of marker 14 past reference head 12 and then past delay head 13) for curve 102. The illustrated curves may be thought of as having been obtained with the mark 14 located at 9 inches from the axis of rotation of the pulley 10. Thus, 100 r.p.m. in the chart of FIG. 3 would correspond to a surface velocity of 5,650 inches per minute. Referring to the chart, it will be observed that if 100 revolutions per minute is to be the critical rotational velocity, the speed selector knob 97 would be set at approximately 44 if the heads 12 and 13 have a spacing of 270°. Alternatively, if the heads are provided with a spacing of only 180°, the selector knob 97 would be set at a value of about 52. With this high a value of surface velocity of the marker 14, the system would be relatively insensitive where the heads 12 and 13 had an angular spacing of only 90°.

At the right hand side of FIG. 1a, the relative timing between the control pulse 94 and the delay or speed responsive pulse 77 is illustrated. The module 73 includes an AND gate circuit 105 which supplies an output pulse via conductor 106 when the control pulse 94 is at least partially time coincident with the associated speed responsive pulse 77. Thus, so long as the marker 14 is travelling above the critical speed as determined by the setting of the speed selector knob 97, the AND gate circuit 105 will supply a series of output pulses such as indicated at 107 having a repetition rate equal to the rate of rotation of the pulley 10.

The output pulses from the AND gate circuit 105 are supplied to a second monostable circuit 110 which supplies a standard output pulse such as indicated at 111 having a time duration of approximately ½ second, for example, to provide more power to the relay driving circuit 114 of module 73.

The relay driving circuit 114 includes a time delay circuit for maintaining a relay drive amplifier 116 in a conductive condition for relatively low rates of rotation of the pulley 10. The illustrated timing circuit includes a diode 118, a capacitor 119 and a potentiometer 120. The pulses 111 from monostable circuit 110 serve to charge capacitor 119 and to render the amplifier 116 conducting to energize relay coil 76. The discharge circuit for the capacitor 119 extends from the upper plate thereof through conductor 122, potentiometer 120 and conductor 123 and conductor 124 to the lower plate of the capacitor 119. The rate of discharge of the capacitor is thus adjustable by means of the setting of the potentiometer 120. The means for adjusting the setting of the potentiometer 120 is indicated as comprising a slotted member 130 which is rotatable by means of a screwdriver or the like and has a mechanical coupling with the potentiometer as indicated at 131.

The various parameters of the commercial embodiment illustrated in FIG. 1 are tabulated as follows:

Marker 14:
    Permanent magnet 15—Alnico V ⅞ inch diameter by ⅝ inch long
    Jacket 24—aluminum tube 1⅝ inch diameter by 1¼ inch long with ¹⁄₁₆ inch wall thickness
Head 12:
    Pickup coil 16—18,000 turns No. 42 AWG
    Core—laminations ¾ inch long and projecting from coil 16 toward marker 14 a distance of ⅛ inch
    Leads 60 and 61—each 2 inches long and No. 26 AWG
    Jacket 30—aluminum tube 4″ long, 1¼ inch outside diameter, 1¹⁄₁₆ inside diameter
    Transistor 18—PNP Germanium type 2N1414
Head 13: Identical to head 12
Connector 35: ½ inch conduit "Sealtite" connector
Cables 36 and 37: Each 10 foot 6 inch lengths of #8790 or #8792 Belden 2 conductor (Stranded) No. 18 AWG shielded
Transformer 90:
    Primary 95–130 volts, 50–60 cycles per second
    Secondary winding sections—each 26.6 volts A.C.
Module 71:
    Diodes—each Solitron CER–67
    Capacitors—each 500 microfarads, 50 volts D.C.
    Resistor—1,500 ohms, ½ watt
    Transistor—type 2N178
    Regulator diode—Motorola type ZA–18A
Module 72: Transistors—all type 2N3644

| Resistor | Value (ohms) | Resistor | Value (ohms) |
|---|---|---|---|
| 72-1 | 15,000 | 72-7 | 15,000 |
| 72-2 | 15,000 | 72-8 | 10,000 |
| 72-3 | 10,000 | 72-9 | 33,000 |
| 72-4 | 33,000 | 72-10 | 15,000 |
| 72-5 | 15,000 | 72-11 | 1,000 |
| 72-6 | 10,000 | | |

| Capacitor | Value (microfarad) | Rating (volts) |
|---|---|---|
| 72-12 | 0.2 | 250 |
| 72-13 | 0.2 | 250 |
| 72-14 | 20 | 25 |
| 72-15 | 0.2 | 250 |
| 72-16 | 0.2 | 250 |
| 72-17 | 20 | 25 |

Potentiometer 95: 0 to 250,000 ohms, 2 watts
Potentiometer 120: 0 to 350,000 ohms, 2 watts
Module 73: Transistors—all type 2N3644

| Resistor | Value (ohms) | Resistor | Value (ohms) |
|---|---|---|---|
| 73-1 | 15,000 | 73-6 | 47,000 |
| 73-2 | 150,000 | 73-7 | 1,000 |
| 73-3 | 10,000 | 73-8 | 10 |
| 73-4 | 15,000 | 73-9 | 10 |
| 73-5 | 2,200 | 73-10 | [1] 82 |

[1] 1 watt.

| Capacitor | Value (microfarad) | Rating (volts) |
|---|---|---|
| 73-11 | 0.2 | 250 |
| 73-12 | 0.2 | 250 |
| 119 | 20 | 25 |

Relay 74: Dust-tight, plug-in. Two "C" contacts (DPDT) rated at 8 amperes resistive, 115/230 volts A.C., ¼ H.P. Temperature: 0–150° F.

All resistors in the above table are ½ watt with a 10% tolerance unless otherwise indicated. The modules 71–73 are preferably potted. The terminals 141–151 indicated at the left in FIG. 1 may be a part of a terminal strip secured to the chassis carrying modules 71–74. The modules may be of the plug-in type utilizing an octal type socket. The chassis may mount the terminal strip, lamp 82, transformer 90, speed selector knob 97, time delay adjustment 130 and modules 71–74 and may have overall dimensions of 6.87 inches by 8.75 inches. The control box enclosing the chassis may have overall dimensions of 8 inches by 11.5 inches by 4.31 inches.

The sensing heads 12 and 13 in the commercial embodiment are mounted to clear the marker by 1 inch or less. A typical sensing range for a belt pulley of 24 to 36 inch diameter would be from 25 revolutions per minute to 300 revolutions per minute. Higher or lower speeds are possible on special application. Speed changes as little as 5% (typical) can be detected. The speed selector knob 97 can vary the control pulse 94 from approximately 0.15 second duration to approximately 3 seconds duration. The time delay circuit 114 can be varied by means of adjustment 130 to supply a time delay of from approximately 1 second to several seconds to allow the relay 76 to remain energized over the various conditions encountered in sensing over a speed range of better than 10 to 1. The relay 74 has both normally open and normally closed contacts for alarms and/or controls. The speed sensor can be used for either underspeed or overspeed applications.

For underspeed operation, knob 97 is adjusted to provide control pulses 94 having sufficient duration so that pulses 77 occur within the time interval of control pulses 94. The relay coil 76 is then maintained energized unless the pulley 10 slows down to such an extent that the pulses such as 77 occur after the trailing edge of the control pulses 94. The amount of slow down necessary for relay drop out can be varied from a theoretical 100% of rated speed to a possible 20% of rated speed. Practical factors dictate settings of from 90% of rated speed to 50% of rated speed as the most reliable set-point values. The relay 74 is operated for correct speed indication. This provides fail-safe operation from the standpoint of relay drop out due to circuit failure, because the same signal is developed in the event of a circuit failure.

For overspeed operation, the speed selector 97 is adjusted so that it indicates a speed of from 10% to 50% higher than the rated speed. This would cause the pulse 94 to be too narrow to include pulse 77, and only a speed increase would bring about coincidence of the pulses 94 and 77 so as to energize relay coil 76. In this case the relay coil 76 is only energized when the over speed condition occurs. The relay 74 has single pole double throw contacts for control so that the circuit logic can suit the application. No circuit changes are necessary for overspeed operation—only adjustment of speed selector knob 97 and the corresponding use of the relay contacts connected with terminals 141–146.

The formation of a large enough pulse by the pick-up coils 16 and 20 is vital for reliable operation of the unit. The amplitude of these pulses depends upon the spacing between the respective heads 12 and 13 and the mark assembly 14 and upon the speed at which the mark assembly 14 travels relative to the sensing heads. If pulses of satisfactory amplitude are being produced by the pick-up coils, then operation depends upon being able to adjust monostable 80 so that the control pulses overlap with the pulses 77 from the head 13. Normal speed sensing values range from 90% to 50% of rated speed with an 80% setting of speed selector 97 recommended as best on systems driven by induction or synchronous motors. Used for overspeed sensing, 110 to 200% of rated speed is the normal range with 120% as the recommended setting of the speed selector knob 97.

The head to mark spacing in the preferred embodiment should be 1 inch maximum with ¾ inch recommended so that plus or minus ¼ inch variations will not go beyond 1 inch nor reduce clearance to less than ½ inch. For the standard sensing head assemblies 12 and 13 shown in FIG. 1, the relative speed of the mark assembly 14 should be not less 1500 inches per minute.

FIG. 2 shows a relatively high sensitivity sensing head assembly 150 wherein pick-up coil 151 and core 152 may have the construction previously given with respect to the sensing head assemblies 12 and 13. In FIG. 2, however, one terminal of the pick-up winding 151 is connected to the base electrode of a transistor 154 while the other terminal of the pick-up winding 151 is connected with the emitter electrode of transistor 154 through a resistance element 156 and is also connected with the emitter electrode of a second transistor 158. The emitter electrode of transistor 154 is connected to the base electrode of transistor 158 and the collector electrodes of the two transistors are connected together and to one output terminal 160 corresponding to the output terminal 148 or 149 of FIG. 1. The other output terminal 161 corresponds to the output terminal 147 of FIG. 1 and is preferably connected to ground. The system of FIG. 2 is identical with the system of FIG. 1 except for the substitution of sensing head assembly 150 for the sensing head assemblies 12 and 13. The relative speed of the mark 14 relative to sensing heads such as 150 should be not less than 500 inches per minute.

If the sensing heads 12 and 13 or the sensing heads of the type shown at 150 in FIG. 2 are spaced an accurate 180° apart with respect to the angular travel of the mark assembly 14, then the approximate speed can be inferred from the setting of the speed selector knob 97 on the basis of graphs such as shown in FIG. 3. Interpolation is possible for other head spacings. This is not intended for accurate calibration, but approximate speeds can be determined. As indicated in FIG. 3, the standard sensing head assemblies of FIG. 1 will operate from approximately 30 revolutions per minute to 300 revolutions per minute with 18 inch diameter mark placement. Sensing heads of the type shown in FIG. 2 are particularly for applications where the mark velocity is lower than 1500 inches per minute but greater than 500 inches per minute. The sensing heads 150 might also be used to get operation at better than 1500 inches per minute with greater than 1 inch head to mark spacing.

The adjustment 130 serves to keep the relay coil 76 energized between pulses when the mark 14 is rotating at relatively low angular velocities and provides delayed relay drop out, if desired, at higher angular velocities. A minimum relay drop out of 1 second is a residual design feature.

The placement of the mark 14 on the moving part such as indicated at 10 and the location of the heads with respect to the mark are the main problems of installation. Many arrangements are possible. For speed sensing on a large conveyor belt, the mark may be mounted on the tail pulley such as indicated at 10. The principles of this type of arrangement may be used for other systems. The mark must be placed at sufficient diameter on the end surface of the tail pulley 10 so that its linear speed is compatible with the minimum speeds required for the head assemblies 12 and 13 or for the head assemblies such as indicated at 150. When a suitable location is determined, it may be helpful to draw a complete circle of this diameter on the pulley by holding a piece of chalk while the pulley is jogged one revolution. The mark is then fastened to the belt pulley end surface with its center on the chalk line, for example by drilling and tapping two holes that will allow bolting the mark securely using bolts and lock washers. It is possible to tack weld the mark in place also, but bolts are recommended for ease of replacement, should damage occur to the mark.

The chalk line drawn on the tail pulley end surface will indicate the path of the mark. Both sense heads must be positioned over this path but with about ¾ inch clearance from the mark as it passes. The angular separation of the two heads is not critical but enters into the operation and calibration. Generally from 90° to 270° is satisfactory. For slow angular velocities (under 50 revolutions per minute) closer to 90° is better, while on systems with relatively higher angular velocities (over 150 revolutions per minute) closer to 270° is preferred. This can be seen from FIG. 3.

If the tail pulley is movable for belt tensioning, the brackets to which the sense heads are mounted must be fastened to this movable structure also so that the position of the sense heads is always constant with respect to the mark path under varying positions of the tail pulley. Sense head mounting brackets will vary with each conveyor arrangement, but must be as free from vibration as possible, easily accessible for installation, and as protected as possible from falling material.

The preferred placement of the control box containing modules 71–74 is within reach of the 10 foot sense head cables 36 and 37 and on a wall, beam, or other suitable structure that is relatively free from vibration, accessible for adjustments and protected from mechanical damage.

In starting up the system, if the speed sensor control contacts of relay 74 are interlocking the conveyor run circuit, they should be jumpered or by-passed until the sensor is set up for final operation. With the use of an alarm circuit such as indicated at 84, manual switch 85 may be opened until the conveyor reaches a rated speed.

In adjusting the system for underspeed operation, the speed dial 97 should be set to the 100 mark on the dial (full clockwise as viewed in FIG. 1). This puts the speed set point at maximum speed which should be above the speed of the conveyor. Also the screwdriver adjustment 130 should be adjusted to ⅓ of clockwise travel for average time delay. This gives good response for set-up purposes.

The relay 74 should not be energized, and thus the lamp 82 should remain in the "off" condition. The speed dial 97 is now turned to lower speed settings until the relay coil 76 is energized and the pilot 82 comes on. The number of the setting of knob 97 corresponds to the rated speed of the conveyor. With the aid of the graph shown in FIG. 3, the knob 97 is now reduced to a setting corresponding to approximately 80% of rated speed. This is the recommended setting for knob 97 for relatively close speed protection. If a lower percentage is desired, this may also be determined from the curves of FIG. 3.

On systems running about 80 revolutions per minute and slower the response time of the relay 74 may be too fast to hold in on its initial setting so that the relay will drop out and pull in each pulley revolution. In some cases it may take several revolutions before it drops out and re-pulls. To increase time delay sufficiently to hold the relay continuously operated, the adjustment 130 is turned clockwise until reliable relay operation is attained.

On a fast system of 800 revolutions per minute or more, the only evident effect of increasing the relay time delay is the time for relay drop out after set-point speed is past. The object is to adjust so that the relay is continuously "on" for normal steady speed and then have it drop out when the speed goes below the set-point.

For overspeed set-up, the speed dial 97 is initially for the slowest speed (0 on the dial) and the relay time delay at ⅓ of clockwise travel. When the conveyor is running at rated speed the relay should be "on" as indicated by energization of the lamp 82. Slowly increase the speed dial until the light goes "off." This dial setting corresponds to the rated speed of the conveyor. With the aid of the graphs of FIG. 3, increase the speed dial to get the desired percentage of overspeed protection. Again, if necessary, increase the relay time delay by screwdriver adjustment 130 until the relay holds in steady and reliably when the overspeed condition exists. If possible, run the conveyor at overspeed to check the pull-in of the relay for an overspeed condition. There is about one-half second delay for pick-up of the relay on overspeed operation.

The modular construction is used to provide a simple means of trouble shooting by interchanging old modules with new ones.

With respect to the high sensitivity head assembly 150 of FIG. 2, the head dimensions and construction may be the same as for the head assemblies 12 and 13. Resistor 156 may have a resistance value of 1000 ohms. All of the resistors referred to herein are ½ watt plus or minus 10% resistors unless otherwise indicated. The transistors 154 and 158 may be type 2N1414 PNP germanium transistors.

SUMMARY OF OPERATION

In operating the system as an underspeed detector, for example, with the conveyor including tail pulley 10 operating at rated speed, manual switch 85 is closed to place alarm circuit 84 in operative condition. Thereafter, should pulley 10 fall below a certain critical speed as determined by the setting of selector 97, for example due to belt slippage, the pulses 77 from the delay head assembly 13 will be relatively delayed in comparison to the control pulses 94 from monostable 80 which is driven from the reference head assembly 12. The result will be the absence of signal pulses from the AND circuit 105, FIG. 1b, allowing the relay coil 76, FIG. 1a, to become deenergized and completing the circuit btween terminals 144 and 145 to cause a signal from the alarm circuit 84.

For use of the system as an overspeed detector, the alarm circuit 84 could be placed between normally open contacts of relay 74 by connecting the alarm circuits to terminals 145 and 146, for example. In this case, with the conveyor operating at its normal speed, the pulses 77 would occur after the trailing edge of the respective control pulses 94 so that the relay coil 76 would remain deenergized. If, however, the conveyor reached an abnormally high critical speed as determined by the setting of knob 97 then the relay 76 would be energized causing the alarm circuit 84 to give a signal.

It will be apparent that many modifications and variations may be effected without departing from the scope of the novel concepts of the present invention. As one example, only a single sensing head such as 12 or 150 might be utilized along the path of relative movement of the mark 14, and successive pulses from the sensing head could be delivered alternately to terminal 148 and 149 by means of an electronic switch or the like. As another alternative, two or more marks 14 might be utilized in conjunction with a single sensing head, for example.

I claim as my invention:

1. A speed sensing system comprising
    speed responsive means for alternately producing reference pulses and speed responsive pulses with each speed responsive pulse having a spacing in time from a preceding reference pulse which is a function of the speed being sensed,
    reference pulse responsive means coupled with said speed responsive means for receiving said reference pulses and responsive to each reference pulse to generate a control pulse occurring during a predetermined time interval relative to the reference pulse which produced it, and
    speed sensing means having at least first and second speed indicating conditions and coupled to said speed responsive means and to said reference pulse responsive means for receiving the control pulses and the speed responsive pulses and responsive to one time relationship of the control pulses and the speed responsive pulses to assume said first speed indicating condition, and assuming said second speed indicating condition when the speed responsive pulses have a second time relationship relative to said control pulses,
    said speed responsive means comprising a magnetic member for attachment to a movable element whose speed is to be sensed, and means comprising at least one pick-up coil responsive to passage of said magnetic member in proximity thereto to produce the alternate reference pulses and speed responsive pulses,
    said pick-up coil having a magnetic core with a pole face for disposition in proximity to the path of the magnetic member, and said magnetic member comprising a permanent magnet, and said speed responsive means further comprising a solid state amplifier device responsive to the voltage pulse induced in said pick-up coil by movement of the permanent magnet past said pick-up coil at a distance of about one inch from the pole face thereof to switch from one distinct operating condition to an opposite distinct operating condition, said solid state amplifier device comprising a transistor with its base and emitter terminals connected to said pick-up coil by an electrically conductive path of substantially zero impedance, said pick-up coil having approximately 18,000 turns, and the movement of the permanent magnet past said pick-up coils at a speed of about 1500 inches per minute generating a voltage pulse in said pick-up coil of amplitude to switch said transistor from a conducting condition to a non-conducting condition.

2. A speed sensing system comprising
    speed responsive means for alternately producing reference pulses and speed responsive pulses with each speed responsive pulse having a spacing in time from a preceding reference pulse which is a function of the speed being sensed,
    reference pulse responsive means coupled with said speed responsive means for receiving said reference pulses and responsive to each reference pulse to generate a control pulse occurring during a predetermined time interval relative to the reference pulse which produced it, and
    speed sensing means having at least first and second speed indicating conditions and coupled to said speed responsive means and to said speed responsive means and to said reference pulse responsive means for receiving the control pulses and the speed responsive pulses and responsive to one time relationship of the control pulses and the speed responsive pulses to assume said first speed indicating condition, and assuming said second speed indicating condition when the speed responsive pulses have a second time relationship relative to said control pulses,
    said speed responsive means comprising a magnetic member for attachment to a movable element whose speed is to be sensed, and means comprising at least one pick-up coil responsive to passage of said magnetic member in proximity thereto to produce the alternate reference pulses and speed responsive pulses,
    said pick-up coil having a magnetic core with a pole face for disposition in proximity to the path of the magnetic member, and said magnetic member comprising a permanent magnet, and said speed responsive means further comprising a solid state amplifier device responsive to the voltage pulse induced in said pick-up coil by movement of the permanent magnet past said pick-up coil at a distance of about one inch from the pole face thereof to switch from one distinct operating condition to opposite distinct operating condition, said solid state amplifier device comprising a first transistor having its base electrode connecting to one end of said coil and having its emitter electrode connected with the other end of the pick-up coil through a resistance, the second transistor having its collector electrode connected to the collector electrode of the first transistor, having its base electrode connected to the emitter electrode of the first transistor and having its emitter electrode connected to said other terminal of said pick-up coil, said pick-up coil having approximately 18,000 turns, and said first and second transistors being responsive to a voltage pulse generated in said pick-up coil by movement of the permanent magnet past said pick-up coil at a speed of about 500 inches per minute to switch said second transistor from its conducting to its non-conducting condition.

3. A speed sensing system comprising speed responsive means for alternately producing reference pulses and speed responsive pulses with each speed responsive pulse having a spacing in time from a preceding reference pulse which is a function of the speed being sensed, reference pulse responsive means coupled with said speed responsive means for receiving said reference pulses and responsive to each reference pulse to generate a control pulse occurring during a predetermined time interval relative to the reference pulse which produced it, and speed sensing means having at least first and second speed indicating conditions and coupled to said speed responsive means and to said reference pulse responsive means for receiving the control pulses and the speed responsive pulses and responsive to one time relationship of the control pulses and the speed responsive pulses to assume said first speed indicating condition, and assuming said second speed indicating condition when the speed responsive pulses have a second time relationship relative to said control pulses, said speed responsive means comprising a magnetic member for attachment to a movable element whose speed is to be sensed, and means comprising at least one pick-up coil responsive to passage of said magnetic member in proximity thereto to produce the alternate reference pulses and speed responsive pulses, said pick-up coil having a magnetic core with a pole face for disposition in proximity to the path of the magnetic member, and said magnetic member comprising a permanent magnet, and said speed responsive means further comprising a solid state amplifier device responsive to the voltage pulse induced in said pick-up coil by movement of the permanent magnet past said pick-up coil at a distance of about one inch from the pole face thereof to switch from one distinct operating condition to an opposite distinct operating condition, said pick-up coil and said solid state amplifier device being embedded in a non-magnetic material and forming a unit having a length of not more than about 4 inches and with cross sectional dimensions substantially less than its length dimension.

4. A speed sensing system comprising speed responsive means for alternately producing reference pulses and speed responsive pulses with each speed responsive pulse having a spacing in time from a preceding reference pulse which is a function of the speed being sensed, reference pulse responsive means coupled with said speed responsive means for receiving said reference pulses and responsive to each reference pulse to generate a control pulse occurring during a predetermined time interval relative to the reference pulse which produced it, and speed sensing means having at least first and second speed indicating conditions and coupled to said speed responsive means and to said reference pulse responsive means for receiving the control pulses and the speed responsive pulses and responsive to one time relationship of the control pulses and the speed responsive pulses to assume said first speed indicating condition, and assuming said second speed indicating condition when the speed responsive pulses have a second time relationship relative to said control pulses, said speed responsive means comprising a magnetic member for attachment to a movable element whose speed is to be sensed, and means comprising at least one pick-up coil responsive to passage of said magnetic member in proximity thereto to produce the alternate reference pulses and speed responsive pulses, said magnetic member comprising a permanent magnet having a polar face for passage in proximity to said pick-up coil, and said polar face having a layer of non-magnetic material thereon to facilitate release of stray magnetic material therefrom.

5. The speed sensing system of claim 4 with a solid state amplifier device connected to the terminals of said pick-up coil, and said layer of non-magnetic material being integral with non-magnetic material embedding said pick-up coil and said solid state amplifier device.

6. A speed sensing system comprising speed responsive means for alternately producing reference pulses and speed responsive pulses with each speed responsive pulse having a spacing in time from a preceding reference pulse which is a function of the speed being sensed, reference pulse responsive means coupled with said speed responsive means for receiving said reference pulses and responsive to each reference pulse to generate a control pulse occurring during a predetermined time interval relative to the reference pulse which produced it, and speed sensing means having at least first and second speed indicating conditions and coupled to said speed responsive means and to said reference pulse responsive means for receiving the control pulses and the speed responsive pulses and responsive to one time relationship of the control pulses and the speed responsive pulses to assume said first speed indicating condition, and assuming said second speed indicating condition when the speed responsive pulses have a second time relationship relative to said control pulses, the reference pulse responsive means comprising a monostable circuit having a stable state and a quasi-stable state and responsive to each reference pulse to shift to its quasi-stable state for said predetermined time interval to supply one of said control pulses to said speed sensing means, the monostable circuit having a minimum speed selector means for adjusting the duration of the quasi-stable state and operative to vary the time constant of the monostable circuit substantially as a logarithmic function in association with said minimum speed selector means to facilitate setting of the monostable circuit to generate a control pulse corresponding to a desired minimum speed below which said speed sensing means will assume its second speed indicating condition.

7. A speed sensing system comprising speed responsive means for alternately producing reference pulses and speed responsive pulses with each speed responsive pulse having a spacing in time from a preceding reference pulse which is a function of the speed being sensed, reference pulse responsive means coupled with said speed responsive means for receiving said reference pulses and responsive to each reference pulse to generate a control pulse occurring during a predetermined time interval relative to the reference pulse which produced it, and speed sensing means having at least first and second speed indicating conditions and coupled to said speed responsive means and to said reference pulse responsive means for receiving the control pulses and the speed responsive pulses and responsive to one time relationship of the control pulses and the speed responsive pulses to assume said first speed indicating condition and assuming said second speed indicating condition when the speed responsive pulses have a second time relationship relative to said control pulses, said speed sensing means comprising a logical AND circuit having first and second inputs connected to receive said control pulses and said speed responsive pulses, respectively, and supplying a series of coincidence pulses at its output in response to the time coincidence of successive control and speed responsive pulses, said speed sensing means further comprising an output circuit having first and second stable speed indicating conditions defining respectively said first and second speed indicating conditions of said speed sensing means, said output circuit being shiftable from the second stable condition to the first stable condition in response to said series of coincidence pulses from said AND circuit, and shiftable from the first stable condition to the second stable condition in the absence of coincidence pulses from said AND circuit, said output circuit comprising a relay, and relay driving driving means for maintaining said relay in an energized condition in response to coincidence pulses occurring at the rate of about 30 per minute, said relay driving means comprising a capacitor, a unidirectional conductive element coupled to the output of the AND circuit and to the capacitor for transmitting coincidence pulses to the capacitor to charge the same, variable resistance means controlling the rate of discharge of said capacitor, and power translating means having its input connected to said capacitor and controlling energization of said relay for maintaining said relay energized as long as the charge on said capacitor exceeds a given value.

8. The speed sensing system of claim 7 with said AND circuit having a monstable circuit interposed between the output of its AND gate and said unidirectional conductive element for increasing the duration of the coincidence pulses from the AND gate to about ½ second.

9. A speed sensing system comprising speed responsive means for alternately producing reference pulses and speed responsive pulses with each speed responsive pulse having a spacing in time from a preceding reference pulse which is a function of the speed being sensed, reference pulse responsive means coupled with said speed responsive means for receiving said reference pulses and responsive to each reference pulse to generate a control pulse occurring during a predetermined time interval relative to the reference pulse which produced it, and speed sensing means having at least first and second speed indicating conditions and coupled to said speed sponsive means and to said reference pulse responsive means for receiving the control pulses and the speed responsive pulses and responsive to one time relationship of the control pulses and the speed responsive pulses to assume said first speed indicating condition, and assuming said second speed indicating condition when the speed responsive pulses have a second time relationship relative to said control pulses, said speed responsive means comprising a permanent magnet for attachment to a movable member whose speed is to be sensed, first and second pick-up coil assemblies each comprising a coil with a magnetic core terminating in a pole face, the first and second pick-up coil assemblies being disposed with an angle of separation therebetween in the range from about 90° to 270° and with the pole faces thereof about ¾ inch from the path of the permanent magnet, first and second solid state amplifier devices having their respective inputs connected to said coils and having respective outputs for delivering reference pulses and speed responsive pulses, respectively, a reference monostable circuit having a stable state and a quasi-stable state and having its input connected to the output of the first solid state amplifier device to receive said reference pulses therefrom and having an output, and responsive to each reference pulse to switch to its quasi-stable state for a predetermined time interval to generate control pulses each terminating at a selected time in advance of the next succeeding reference pulse, and an AND circuit having first and second inputs connected respectively to the output of said reference monostable circuit and to the output of the second solid state amplifier device and having an output for supplying a series of coincidence pulses only if the successive speed responsive pulses overlap in time with said control pulses.

10. The speed sensing system of claim 9 with a relay driver circuit having a time constant means for maintaining said relay driver circuit in a conducting state in response to coincidence pulses occurring at a rate of about 30 per minute.

11. The speed sensing means of claim 9 with said solid state amplifier devices comprising transistors, and with first and second head units consisting essentially of said coil assemblies, said transistors and passive elements interconnecting the transistors and coil assemblies; and conductors connecting said transistors of said head units with said reference monostable circuit and the second input of said AND circuit respectively, said conductors having a length at least of the order of 10 feet.

12. A speed sensing system comprising speed responsive means for alternately producing reference pulses and speed responsive pulses with each speed responsive pulse having a spacing in time from a preceding reference pulse which is a function of the speed being sensed, reference pulse responsive means coupled with said speed responsive means for receiving said reference pulses and responsive to each reference pulse to generate a control pulse occurring during a predetermined time interval relative to the reference pulse which produced it, and speed sensing means having at least first and second speed indicating conditions and coupled to said speed sponsive means and to said reference pulse responsive means for receiving the control pulses and the speed responsive pulses and responsive to one time coincidence of the control pulses and the speed responsive pulses to assume said first speed indicating condition, and assuming said second speed indicating condition when the speed responsive pulses are displaced in time relative to said control pulses, said speed responsive means comprising a permanent magnet for attachment to a rotating element whose speed is to be sensed, and comprising a pair of pick-up coils for disposition along the path of angular movement of the permanent magnet for respectively generating a reference pulse and a speed responsive pulse in each revolution of the permanent magnet, said pick-up coils being disposed with an angle of separation therebetween in the range from about 90° to about 270°.

References Cited

UNITED STATES PATENTS

| | | | | |
|---|---|---|---|---|
| 3,184,606 | 5/1965 | Ovenden et al. | | |
| 3,340,883 | 9/1967 | Peternel | | 317—5 XR |
| 3,351,811 | 11/1967 | Buckley et al. | | 317—5 |
| 3,365,614 | 1/1968 | Luongo et al. | | 317—5 |

LEE T. HIX, Primary Examiner

W. M. SHOOP, Jr., Assistant Examiner

UNITED STATES PATENT OFFICE
CERTIFICATE OF CORRECTION

Patent No. 3,497,770              Dated February 24, 1970

Inventor(s) W. M. Nellis

It is certified that error appears in the above-identified patent and that said Letters Patent are hereby corrected as shown below:

In the claims; column 10, line 58, please delete "and to said speed responsive means"(second occurrence); column 13, line 38, please delete "driving"; column 13, line 52, "monstable" should read --monostable--; column 14, line 60, "sponsive" should read --responsive--; column 14, line 62, "one" should read --the--.

Signed and sealed this 3rd day of August 1971.

(SEAL)
Attest:

EDWARD M. FLETCHER, JR.          WILLIAM E. SCHUYLER, JR.
Attesting Officer                Commissioner of Patents